United States Patent
Bhosle et al.

(10) Patent No.: US 11,586,459 B2
(45) Date of Patent: *Feb. 21, 2023

(54) GENERATING AND PRESERVING DEFAULT CONFIGURATIONS OF A SYSTEM

(71) Applicant: VMware, Inc., Palo Alto, CA (US)

(72) Inventors: Mayur Bhosle, San Jose, CA (US);
Mukund Gunti, Sunnyvale, CA (US);
Siddharth Gandhi, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/837,760

(22) Filed: Apr. 1, 2020

(65) Prior Publication Data
US 2021/0311756 A1     Oct. 7, 2021

(51) Int. Cl.
*G06F 9/455*     (2018.01)
*G06F 9/445*     (2018.01)
*G06F 16/17*     (2019.01)
*G06F 16/21*     (2019.01)
*G06F 9/54*      (2006.01)

(52) U.S. Cl.
CPC ...... *G06F 9/45558* (2013.01); *G06F 9/44505* (2013.01); *G06F 9/54* (2013.01); *G06F 16/1734* (2019.01); *G06F 16/211* (2019.01); *G06F 2009/45562* (2013.01)

(58) Field of Classification Search
CPC .... G06F 9/45558; G06F 9/44505; G06F 9/54; G06F 16/1734; G06F 16/211; G06F 2009/45562; G06F 9/5077; G06F 16/256; G06F 11/0772; G06F 11/3051; H04L 41/0893; H04L 63/101
See application file for complete search history.

(56) References Cited

U.S. PATENT DOCUMENTS

2002/0120685 A1* 8/2002 Srivastava ............... G06F 9/44
715/255
2005/0091346 A1* 4/2005 Krishnaswami .... G06F 9/44505
719/310

OTHER PUBLICATIONS

Vmware, Inc. "vCenter Server and Host Management," Update 2, 2019 (Modified Jul. 9, 2020), pp. 1-2, 40-70.

* cited by examiner

*Primary Examiner* — Dady Chery
(74) *Attorney, Agent, or Firm* — Kim & Stewart LLP (57) ABSTRACT

A virtualized computing system includes a plurality of hosts, each of which is configured with a virtualization software for supporting execution of virtual machines therein. A method of managing a configuration of a system service in the virtualized computing system includes: upon receiving an application program interface (API) call to operate on a configuration object for a system service that is backed by a configuration schema of the system service, updating a database in accordance with the configuration schema to update or store the configuration of the system service. The system service executes with a configuration that is a combination of a default configuration that is defined in a default configuration schema of the system service and the configuration stored in the database.

20 Claims, 6 Drawing Sheets

FIGURE 1   FIGURE 2

```
/**
 * The {@name DummyConfig} {@term
structure} contains {@term fields} that
 * describe desired configuration
specification for an ESX host.
 */
@key
@configVersion("1.0")
class DummyConfig {

/**
   * This is nodeid
   */
  String nodeId;
  /**
   * This is thumbprint
   */
  @minLength(10) @maxLength(256)
  String thumbprint;

/**
   * This is ip
   */
  String ip;

/**
   * This is authenticationTicket
   */
  String authenticationTicket;

/**
   * This is mpaconfig
   */
  @vital
  String mpaConfig;
}
```

FIGURE 3A

```
{
  "defaults": {},
  "required": [
    "node_id",
    "thumbprint",
    "ip",
    "authentication_ticket",
    "mpa_config"
  ],
  "component": "dummy_component",
  "key": "dummy_config",
  "additionalProperties": false,
  "configVersion": "1.0",
  "type": "object",
  "properties": {
    "ip": {
      "type": "string"
    },
    "node_id": {
      "type": "string"
    },
    "mpa_config": {
      "vital": true,
      "type": "string"
    },
    "authentication_ticket": {
      "type": "string"
    },
    "thumbprint": {
      "minLength": 10,
      "type": "string",
      "maxLength": 256
    }
  }
}
```

FIGURE 3B

```
/**
 * Keyboard configuration that tracks the
keyboard layout to be used on ESX.
 */
@key
@configVersion("1.0")
class Keyboard {

/**
   * This is keyboard layout
   */
  @defaultValue("US Default")
  String layout;
}
```

FIGURE 4A

```
{
  "component": "esx",
  "key": "keyboard",
  "configVersion": "1.0",
  "type": "object",
  "properties": {
    "layout": {
      "type": "string"
    }
  }
}
```

FIGURE 4B

```
{
  "config": {
    "layout": "US Default"
  },
  "component": "esx",
  "key": "keyboard"
}
```

FIGURE 4C

```
{
  "config": {
    "layout": "Korean"
  },
  "component": "esx",
  "key": "keyboard"
}
```

FIGURE 4D

```
string key = "ntp";
string group = "system";
string component = "esx";
ConfigStoreObjectId csoId(key, group, component);
ConfigStoreObjectPtr configObject = make_shared<ConfigStoreObject>(csoId);
configObject->SetValue('server1', 'time.vmware.com');
configObject->SetValue('server2', 'time2.vmware.com');
configObject->SetValue('drift', '...');
ConfigStorePtr store = ConfigStore::GetStore();
store->Set(configObject);
```

| Key | Value |
|---|---|
| ntp | {server1:time.vmware.com}, {server2:time2.vmware.com}, {drift:...} |
| ssh | {SSH_enable:true}, {P1:AES} |

```
string key = "ntp";
string group = "system";
string component = "esx";
ConfigStoreObjectId csoId(key, group, component);
ConfigStoreObjectPtr configObject = make_shared<ConfigStoreObject>(csoId);
configObject->SetValue('server2', 'time3.vmware.com');
ConfigStorePtr store = ConfigStore::GetStore();
store->Update(configObject);
```

| Key | Value |
|---|---|
| ntp | {server1:time.vmware.com}, {server2:time3.vmware.com}, {drift:...} |
| ssh | {SSH_enable:1}, {P1:AES} |

```
string key = "ssh";
string group = "system";
string component = "esx";
ConfigStoreObjectId csoId(key, group, component);
ConfigStorePtr store = ConfigStore::GetStore();
ConfigStoreObjectPtr configObject = store->Get(csoId)
```

| Key | Value |
|---|---|
| ntp | {server1:time.vmware.com}, {server2:time3.vmware.com}, {drift:...} |
| ssh | {SSH_enable:1}, {P1:AES} |

140

| Result: | key: ssh |
|---|---|
|  | value: {SSH_enable:1}, {P1:AES} |

FIGURE 5C

```
string key = "ntp";
string group = "system";
string component = "esx";
ConfigStoreObjectId csoId(key, group, component);
ConfigStorePtr store = ConfigStore::GetStore();
store->Delete(csoId)
```

| Key | Value |
|-----|-------|
| ntp | {drift:...} |
| ssh | {SSH_enable:1}, {P1:AES} |

```
string key = "keyboard";
string group = "system";
string component = "esx";
ConfigStoreObjectId csoId(key, group, component);
ConfigStoreObjectPtr defaultConfig = ConfigStore::GetStore()->GetDefaultConfig(csoId);
```

Result: key: keyboard
value: {layout:Korean}

FIGURE 5E

```
string key = "keyboard";
string group = "system";
string component = "esx";
ConfigStoreObjectId csoId(key, group, component);
ConfigStoreObjectPtr configObject = make_shared<ConfigStoreObject>(csoId);
configObject->SetValue('layout','US Default');
ConfigStorePtr store = ConfigStore::GetStore();
store->Set(configObject);
```

| Key | Value |
|-----|-------|
| ntp | {drift:...} |
| keyboard | {layout:US Default} |
| ssh | {SSH_enable:1}, {P1:AES} |

| Key | Value |
|---|---|
| ntp | {drift:...} |

FIGURE 8

GENERATING AND PRESERVING DEFAULT CONFIGURATIONS OF A SYSTEM

BACKGROUND

A typical software stack for configuration management of a system includes an API (Application Programming Interface) layer, which provides an endpoint to configure and monitor the system, a business logic layer, which contains the API implementation, and a persistence layer, which persists any configuration or state change in the system onto a disk. In this system, it is not possible to figure out all of the configuration tasks performed by the end user while the system is live, especially after a long period of time has passed since boot-up of the system, because the configuration actions are not being persisted. Rather, the resulting state of those actions is persisted. As such, the system can only report the current state of the configuration, and it would not be possible to revert back to a certain configuration state. In fact, it is difficult to even revert back to the initial default configuration state.

The inability to figure out the configuration tasks performed by the user is even a bigger issue when the system must be managed at scale, because the complexity of managing the system grows with number of configurations that must be set and monitored. As a result, only ad hoc solutions, which provide configuration and compliance support for a limited set of configurations, are available in large-scale systems.

SUMMARY

One or more embodiments provide a system in which every single property on the system which needs to be persisted is defined upfront in a configuration schema. The configuration schema classifies each such property as either configuration or state. A "configuration" is data that is provided by the user as part of a configuration action. A "state" is data that is internally generated in the system. The state is further classified into two types, vital or cached. A "vital" state is state data that must be persisted across reboots. A "cached" state is state data that does not need to be persisted across reboots.

In one embodiment, the system is a virtualized computing system comprising a plurality of hosts, each of which is configured with a virtualization software for supporting execution of virtual machines therein. A method of managing a configuration of a system service in such a system includes: upon receiving an application program interface (API) call to operate on a configuration object for a system service that is backed by a configuration schema of the system service, updating a database in accordance with the configuration schema to update or store the configuration of the system service. The system service executes with a configuration that is a combination of a default configuration that is defined in a default configuration schema of the system service and the configuration stored in the database.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 5A illustrates the use of an API to create or overwrite a configuration.

FIG. 5B illustrates the use of an API to update a configuration.

FIG. 5C illustrates the use of an API to retrieve a configuration.

DETAILED DESCRIPTION

Figure 1:
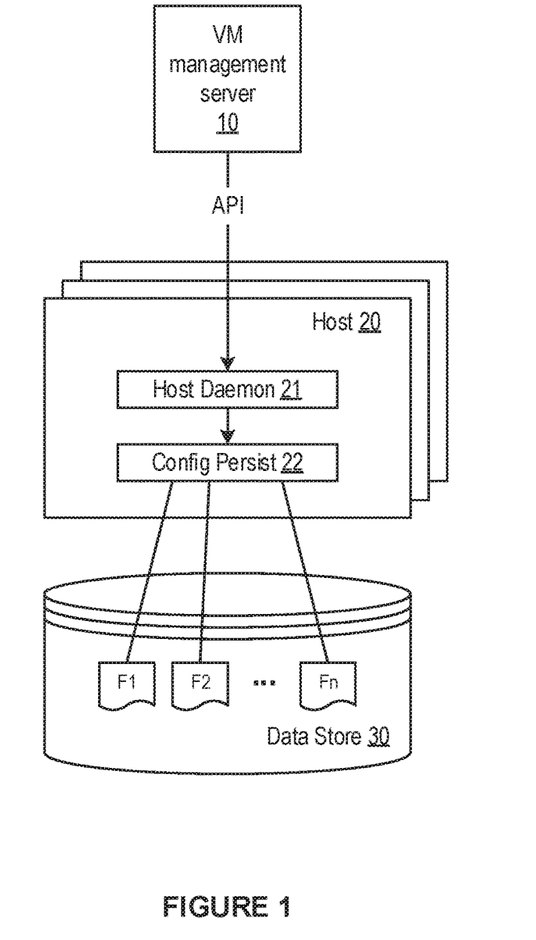
FIG. 1 is a simplified block diagram of a virtualized computing system of the prior art in which configurations are persisted in files.

FIG. 1 is a simplified block diagram of a virtualized computing system of the prior art in which configurations are persisted in files that are stored in data store 30. The virtualized computing system of the prior art includes a virtual machine (M) management server 10 that manages the lifecycle of VMs running in a cluster of hosts 20. To configure system services running in hosts 20, an end user operates a user interface (UI) on VM management server 10 to make configuration API calls to hosts 20, in particular host daemon 21 running in each host 20. Examples of system services that are configured according to embodiments include network time service running on an NTP (network time protocol) server, a secure shell (SSH) service, an authentication service, a firewall service, network service, storage service, keyboard service, etc. Host daemon 21 processes the configuration API calls. If the API call is to set a configuration for a system service, host daemon 21 instructs configuration persistence layer 22 to persist the configuration in one of files, F1, F2, ..., Fn, corresponding to the system service. If the configuration for the system service is persisted in file F1, for example, the next time the system service is executed, it is executed with the configuration stored in file F1.

Figure 2:
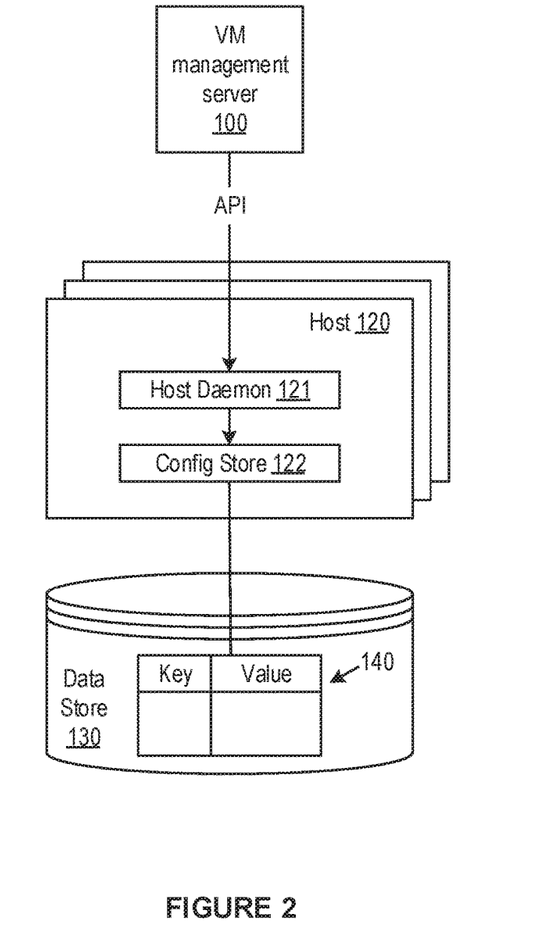
FIG. 2 is a simplified block diagram of a virtualized computing system according to embodiments in which configurations are persisted in key-value store in accordance with a configuration schema.

FIG. 2 is a simplified block diagram of a virtualized computing system according to embodiments in which configurations are persisted in a key-value store 140 provisioned in data store 130. The virtualized computing system according to embodiments includes a VM management server 100 that manages the lifecycle of VMs running a cluster of hosts 120. To configure system services running in hosts 120, an end user operates a UI on VM management server 100 to make configuration API calls to hosts 120, in particular host daemon 121 running in each host 120. Configuration API calls includes a set API call (to set a configuration for a system service), an update API call (to update a configuration for a system service), a get API call (to retrieve a configuration for a system service), a delete API call (to delete a configuration for a system service), and a "get default configuration" API call (to retrieve a default configuration for a system service). Host daemon 121 receives the configuration API call issued by VM management server and passes it onto config store layer 122 for processing. Config store layer 122 exposes configurations for different system services as configuration objects, each backed by a corresponding configuration schema, and records all updates to the configurations of system services in a key-value store 140. In key-value store 140, the "key" corresponds to the system service and the "value" corresponds to one or more configuration properties of that system service.

If the configuration API call is the set API call, config store layer 122 creates or overwrites a configuration object corresponding to the system service identified in the set API call. FIG. 5A illustrates the use of the set API call to create a configuration object corresponding to the system service "ntp" and update key-value store 140 to add this configuration object as a new entry in key-value store 140.

If the configuration API call is the update API call, config store layer 122 updates a configuration object corresponding to the system service identified in the update API call. FIG. 5B illustrates the use of the update API call to update a configuration object corresponding to the system service "ntp" and update key-value store 140 to update this configuration object.

If the configuration API call is the get API call, config store layer 122 retrieves a configuration object for the system service identified in the get API call from key-value store 140. FIG. 5C illustrates the use of the get API call to retrieve a configuration object for the system service "ssh" and the retrieved result.

Figure 5D:
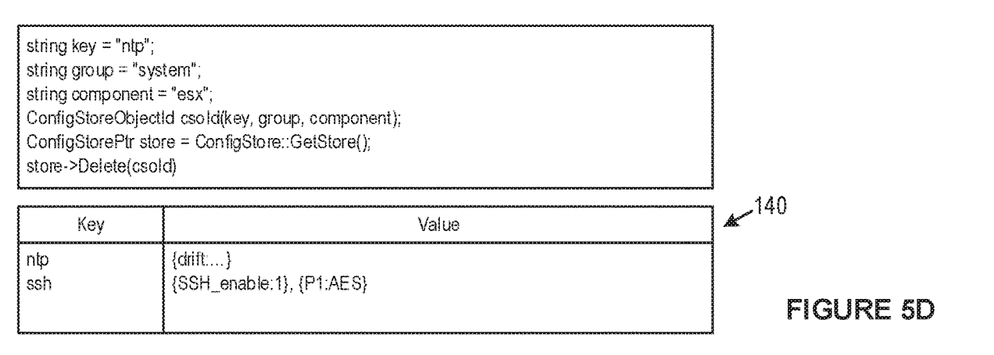
FIG. 5D illustrates the use of an API to delete a configuration.

If the configuration API call is the delete API call, config store layer 122 deletes a configuration object for the system service identified in the delete API call from key-value store 140. FIG. 5D illustrates the use of the delete API call to delete a configuration object for the system service "ntp" from key-value store 140. After this delete API call is processed, the entry for the key "ntp" remains in key-value store 140 because the internal state "drift" is defined in the configuration schema as a "vital" state.

Figure 3A:
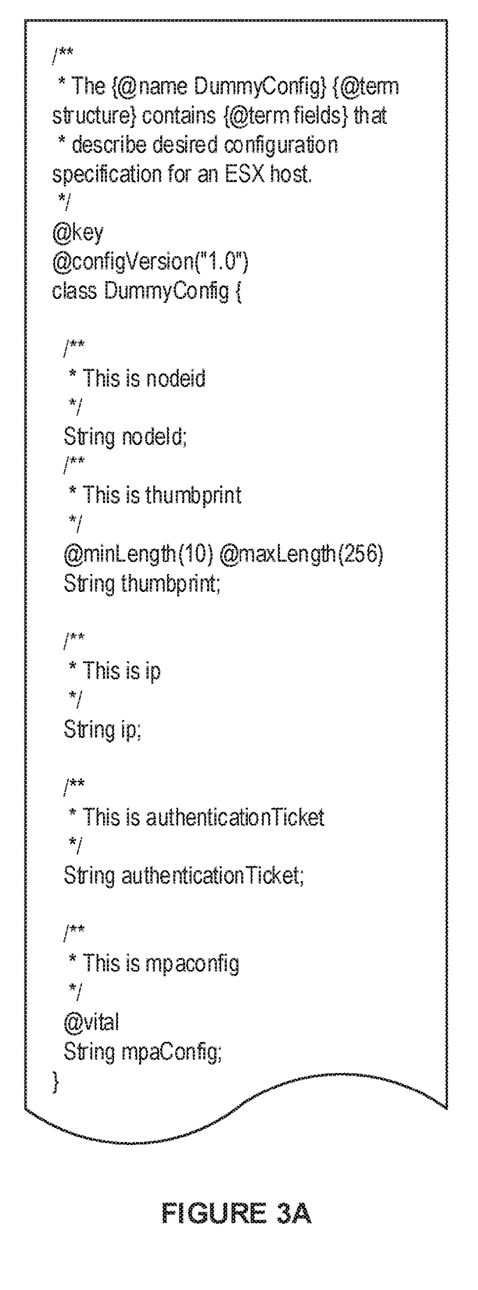
FIG. 3A is an example of a schema definition.

FIG. 3A is an example of a schema definition. The schema definition is written in a high-level language that permits the following annotations:

@vital—Classifies data to be internal state data that must be persisted across reboots.
@cached—Classifies data to be internal state data that is not persisted across reboots.
@defaultValue—Default value for a property.
@minimum @maximum—Minimum and maximum value for an integer property.
@minlength @maxlength—Length restriction on a string value property.
@instanceId @array—A configuration object can have multiple instances and specify a property which uniquely identifies an instance.
@group, @key, @component—Mechanism to identify the root level configuration objects which can read/written to config store layer 122.
@pattern—Mechanism to specify regex.
@foreign_key—Mechanism to define co-relation between configuration objects.
@unique—Mechanism to specify that a property value must be unique across all instances.

Figure 3B:
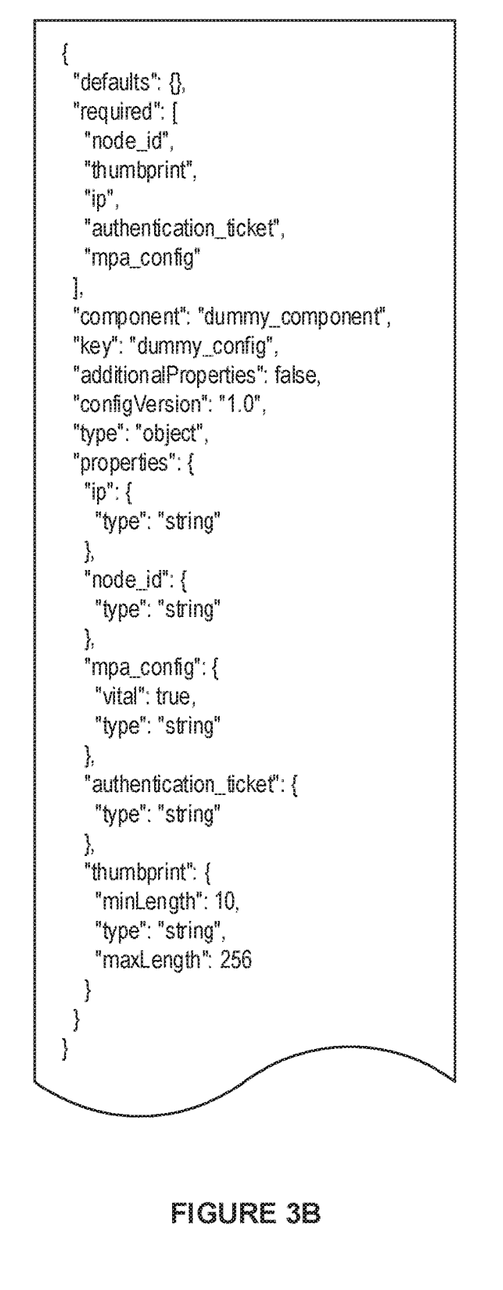
FIG. 3B is a configuration schema generated from the schema definition of FIG. 3A.

The schema definition also specifies data types. The data types include: long (or int for integers), double (for floating point numbers), string, and Boolean. The schema definition of FIG. 3A is fed to a schema toolkit and the schema toolkit generates two files. The first is a configuration schema, one example of which is illustrated in FIG. 3B. The second is a default configuration schema (not shown).

In the embodiments, config store layer 122 employs a validation engine to confirm that a value of a configuration property that is being written into key-value store 140 conforms to @minimum and @maximum specified for an integer type configuration property or @minlength and @maxlength for a string type configuration property. If a value falls outside these specified ranges, an error is returned in response to the API call that triggered the attempt to write the improper value into the key-value store 140.

Figure 4A:
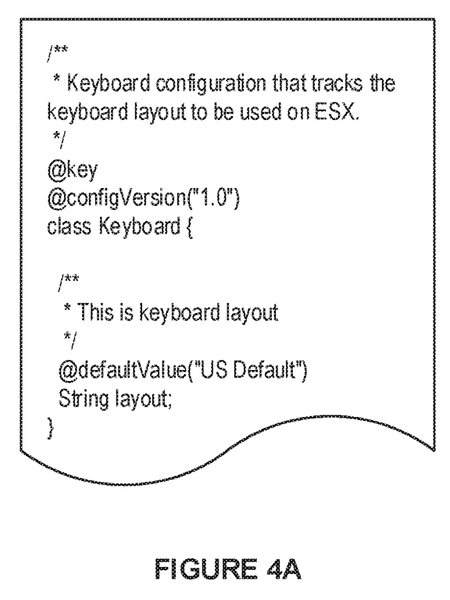
FIG. 4A is another example of a schema definition.
Figure 4B:
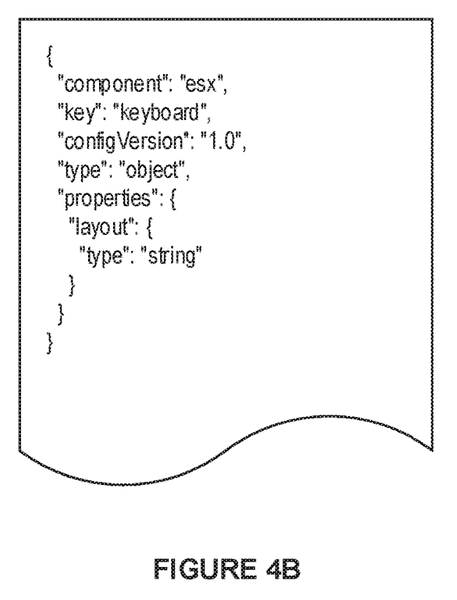
FIG. 4B is a configuration schema generated from the schema definition of FIG. 4A.
Figure 4C:
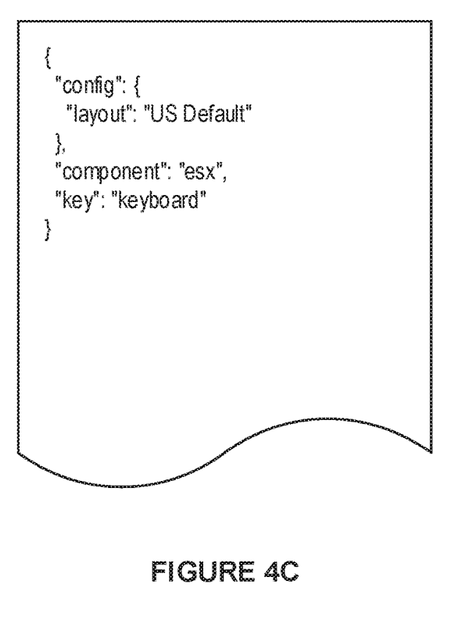
FIG. 4C is a default configuration schema generated from the schema definition of FIG. 4A.
Figure 4D:
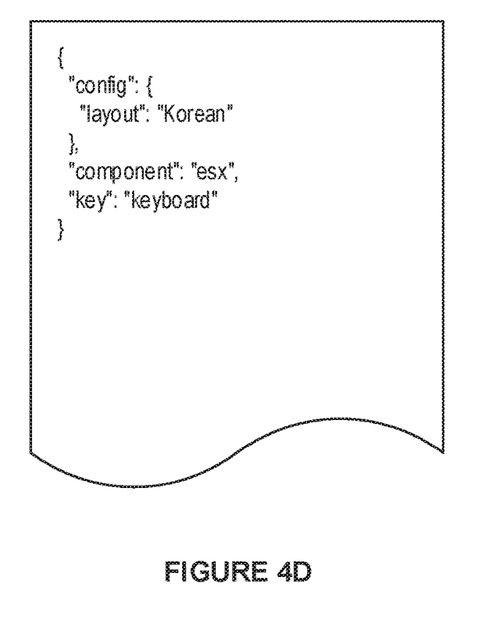
FIG. 4D is an edited version of the default configuration schema of FIG. 4C.

FIG. 4A is another example of a schema definition. FIG. 4B is a configuration schema generated from the schema definition of FIG. 4A, and FIG. 4C is a default configuration schema generated from the schema definition of FIG. 4A. As shown in FIG. 4C, the default configuration property "layout" for a keyboard is "US Default." The default configuration schema may be edited. FIG. 4D is an edited version of the default configuration schema of FIG. 4C. As shown in FIG. 4D, the default configuration property "layout" for a keyboard is now "Korean" (i.e., changed from "US Default" to "Korean").

Figure 5E:
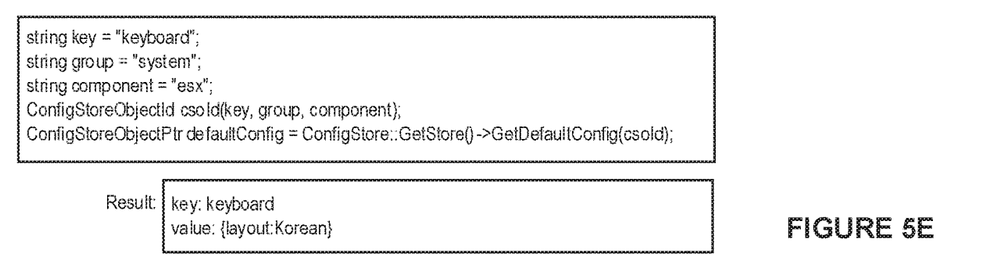
FIG. 5E illustrates the use of an API to retrieve a default configuration.

FIG. 5E is an example that illustrates the use of an API to retrieve a default configuration. In response to this API, config store layer 122 retrieves the default configuration of the system service identified in the API from the default configuration schema, and returns the result. In the example illustrated in FIG. 5E, the default configuration is returned for "keyboard" and the property that has the default configuration is "layout." As shown in FIG. 5E as the result, the default configuration property "layout" for a keyboard is "Korean."

Figure 5F:
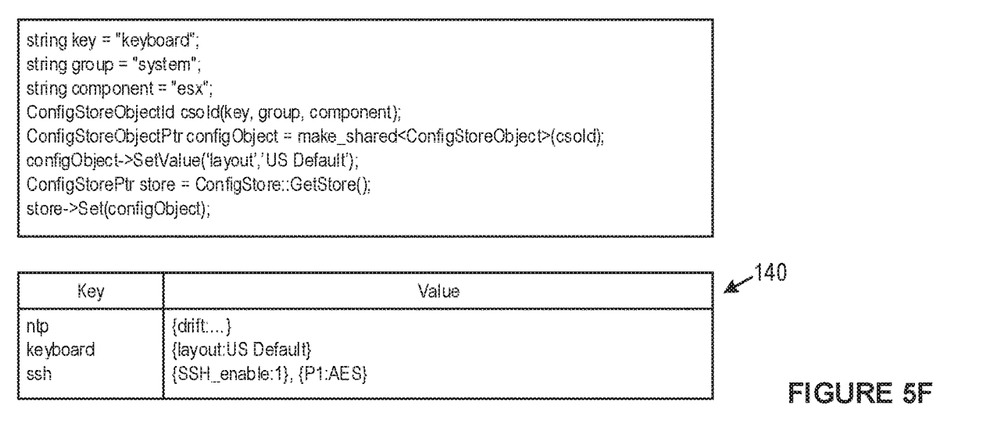
FIG. 5F illustrates the use of an API to overwrite a default configuration.

FIG. 5F is an example that illustrates the use of an API to overwrite a default configuration. In the example of FIG. 5F, the set API is used to overwrite the default configuration, in particular to change the configuration property "layout" for a keyboard to "US Default." In response to this API, config store layer 122 creates a configuration object for "keyboard" and updates key-value store 140 to add an entry to key-value store 140. The added entry has "keyboard" as the key and "{layout:US Default}" as the value, indicating that the configuration property "layout" for a keyboard is "US Default."

Figure 6:
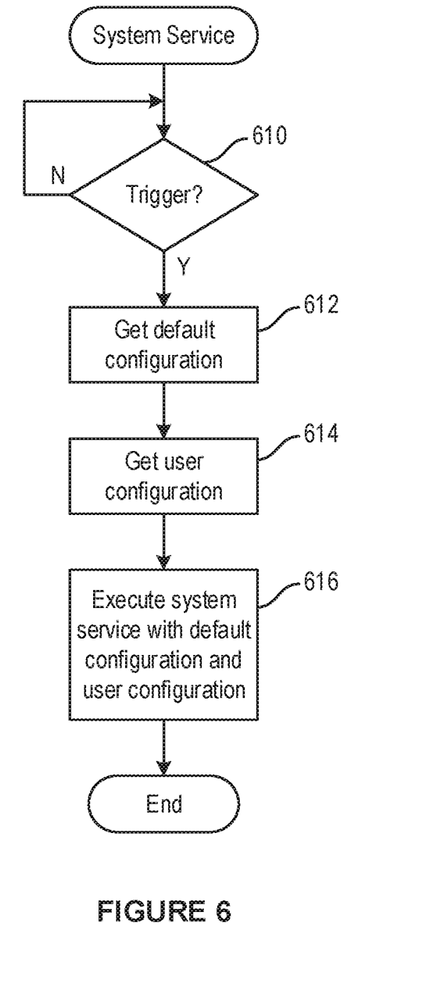
FIG. 6 is a flow diagram that illustrates a system service that executes with a configuration that is set according to embodiments.

FIG. 6 is a flow diagram that illustrates a system service that executes with a configuration that is set according to embodiments. The method of FIG. 6 begins when the system service is triggered at step 610. Then, the system service at step 612 retrieves the default configuration of the system service from the default configuration schema and at step 614 retrieves the user configuration of the system service from key-value store 140. At step 616, the system service is executed with the default configuration and the user configuration. If there is any configuration property that is set in both the default configuration and the user configuration, the configuration property that is set in the user configuration overrides the configuration property that is set in the default configuration.

Figure 7:
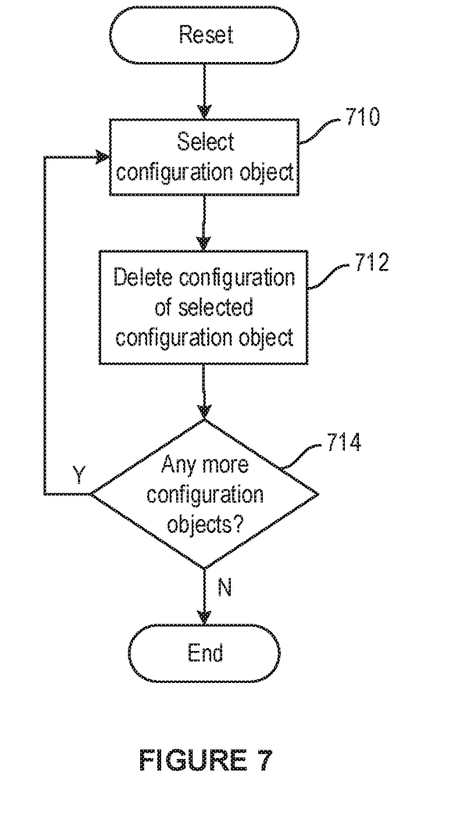
FIG. 7 is a flow diagram that illustrates a method of resetting all system services to execute with a default configuration.

FIG. 7 is a flow diagram that illustrates a method of resetting all system services to execute with a default configuration. The reset command may be issued, for example, as a reset API. The method of FIG. 7 begins at step 710 at which config store layer 122 selects a configuration object. Then, at step 712, config store layer 122 deletes the configuration of the selected configuration object from key-value store 140. At step 714, if there are any more configuration objects, the process returns to step 710. If not, the process ends.

Figure 8:
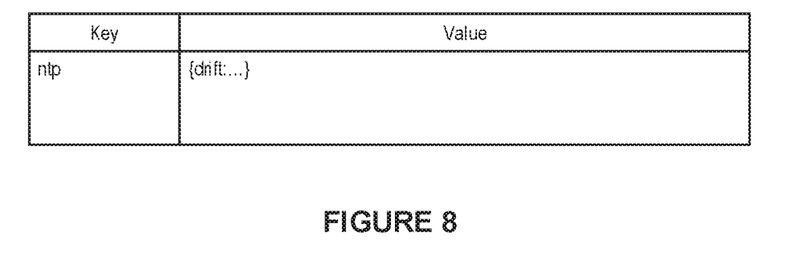
FIG. 8 depicts entries in a key-value store after resetting of FIG. 7 is carried out.

FIG. 8 depicts entries in a key-value store 140 after resetting of FIG. 7 is carried out. As a result of the resetting, all configurations added to key-value store 140 are deleted. As a result, when the system services are run, the only configurations that will be applied are the default configurations defined in the default configuration schema. However, even after the resetting, any "vital" internal states for system services as designated in the schema definitions of the system services are retained in key-value store 140. Accordingly, the data "drift" is retained in key-value storage 140 because it is designated as a "vital" internal state in the schema definition for "ntp."

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing configurations of system services in each of a plurality of hosts, wherein each of the hosts is configured with a virtualization software for supporting execution of virtual machines therein, said method comprising:

upon receiving an application program interface (API) call to operate on a configuration object for a system service that is backed by a configuration schema of the system service, updating a database in accordance with the configuration schema to update or store the configuration of the system service, wherein the system service retrieves a default configuration from a default configuration schema of the system service and retrieves the configuration stored in the database from the database, and executes with a combination of the default configuration retrieved from the default configuration schema and the configuration retrieved from the database.

2. The method of claim 1, wherein the configuration stored in the database overrides the default configuration of the system service for a configuration property that is set by both the configuration stored in the database and the default configuration of the system service.

3. The method of claim 2, wherein the API call is a set API call to set the configuration of the system service, and upon receiving the call to the API call, an entry for the configuration of the system service is added to the database.

4. The method of claim 2, wherein the API call is an update API call to update the configuration of the system service, and upon receiving the API call, an entry for the configuration of the system service in the database is updated.

5. The method of claim 2, further comprising:
upon receiving a get API call to get the configuration of the system service, returning the entry for the configuration of the system service in the database.

6. The method of claim 2, further comprising:
upon receiving a delete API call, deleting the entry for the configuration of the system service in the database.

7. The method of claim 2, further comprising:
upon receiving an API call to get the default configuration of the system service, returning the default configuration of the system service.

8. The method of claim 1, wherein the database is a key-value database and each key corresponds to a unique configuration object.

9. The method of claim 8, further comprising:
upon receiving a request to reset the configurations of the system services, removing all entries of the key-value databases corresponding to the system services.

10. A non-transitory computer readable medium comprising instructions to be executed in a plurality of hosts that are each configured with a virtualization software for supporting execution of virtual machines therein, to carry out a method of managing configurations of system services in the plurality of hosts, said method comprising:
upon receiving an application program interface (API) call to operate on a configuration object for a system service that is backed by a configuration schema of the system service, updating a database in accordance with the configuration schema to update or store the configuration of the system service,
wherein the system service retrieves a default configuration from a default configuration schema of the system service and retrieves the configuration stored in the database from the database, and executes with a combination of the default configuration retrieved from the default configuration schema and the configuration retrieved from the database.

11. The non-transitory computer readable medium of claim 10, wherein the configuration stored in the database overrides the default configuration of the system service for a configuration property that is set by both the configuration stored in the database and the default configuration of the system service.

12. The non-transitory computer readable medium of claim 11, wherein the API call is a set API call to set the configuration of the system service, and upon receiving the call to the API call, an entry for the configuration of the system service is added to the database.

13. The non-transitory computer readable medium of claim 11, wherein the API call is an update API call to update the configuration of the system service, and upon receiving the API call, an entry for the configuration of the system service in the database is updated.

14. The non-transitory computer readable medium of claim 11, further comprising:
upon receiving a get API call to get the configuration of the system service, returning the entry for the configuration of the system service in the database.

15. The non-transitory computer readable medium of claim 11, further comprising:
upon receiving a delete API call, deleting the entry for the configuration of the system service in the database.

16. The non-transitory computer readable medium of claim 11, further comprising:
upon receiving an API call to get the default configuration of the system service, returning the default configuration of the system service.

17. The non-transitory computer readable medium of claim 10, wherein the database is a key-value database and each key corresponds to a unique configuration object.

18. The non-transitory computer readable medium of claim 17, further comprising:
upon receiving a request to reset the configurations of the system services, removing all entries of the key-value databases corresponding to the system services.

19. A cluster of hosts each configured with a virtualization software for supporting execution of virtual machines therein, wherein each of the hosts includes system services and is configured to carry out a method of managing configurations of system services in the plurality of hosts, said method comprising:
upon receiving an application program interface (API) call to operate on a configuration object for a system service that is backed by a configuration schema of the system service, updating a database in accordance with the configuration schema to update or store the configuration of the system service,
wherein the system service executes with a configuration that is a combination of a default configuration that is defined in a default configuration schema of the system service and the configuration stored in the database.

20. The cluster of hosts of claim 19, wherein the method further comprises:
upon receiving a request to reset the configurations of the system services, removing all entries of the key-value databases corresponding to the system services.

* * * * *